(12) United States Patent
Yamashita et al.

(10) Patent No.: US 10,529,960 B2
(45) Date of Patent: Jan. 7, 2020

(54) BATTERY PACK

(71) Applicant: DENSO CORPORATION, Kariya, Aichi-pref. (JP)

(72) Inventors: Koji Yamashita, Kariya (JP); Hiroyoshi Yamamoto, Kariya (JP); Kouichi Umeda, Kariya (JP)

(73) Assignee: DENSO CORPORATION, Kariya (JP)

( * ) Notice: Subject to any disclaimer, the term of this patent is extended or adjusted under 35 U.S.C. 154(b) by 151 days.

(21) Appl. No.: 15/539,834

(22) PCT Filed: Jan. 25, 2016

(86) PCT No.: PCT/JP2016/000353
§ 371 (c)(1),
(2) Date: Jun. 26, 2017

(87) PCT Pub. No.: WO2016/121368
PCT Pub. Date: Aug. 4, 2016

(65) Prior Publication Data
US 2017/0373287 A1 Dec. 28, 2017

(30) Foreign Application Priority Data

Jan. 27, 2015 (JP) ................................. 2015-013544

(51) Int. Cl.
*H01M 2/12* (2006.01)
*H01M 2/10* (2006.01)
*H01M 10/6567* (2014.01)

(52) U.S. Cl.
CPC ....... *H01M 2/1005* (2013.01); *H01M 2/1077* (2013.01); *H01M 2/12* (2013.01); *H01M 2/1252* (2013.01); *H01M 10/6567* (2015.04); *H01M 2220/20* (2013.01)

(58) Field of Classification Search
None
See application file for complete search history.

(56) References Cited

U.S. PATENT DOCUMENTS

| 6,479,185 | B1 * | 11/2002 | Hilderbrand | ........ | H01M 2/1077 |
| | | | | | 429/148 |
| 2009/0317695 | A1 * | 12/2009 | Wood | .................... | H01M 2/105 |
| | | | | | 429/53 |
| 2013/0082659 | A1 | 4/2013 | Kano | | |
| 2014/0038020 | A1 | 2/2014 | Murata et al. | | |
| 2014/0193674 | A1 | 7/2014 | Takasaki et al. | | |
| 2015/0255225 | A1 * | 9/2015 | Kusaba | ............... | H01M 10/625 |
| | | | | | 429/120 |

FOREIGN PATENT DOCUMENTS

| JP | 2011-070872 A | 4/2011 | | |
| JP | 2012-119138 A | 6/2012 | | |
| JP | 2012-204193 A | 10/2012 | | |
| WO | WO-2014083600 A1 * | 6/2014 | .......... | H01M 10/625 |

* cited by examiner

*Primary Examiner* — Wojciech Haske
(74) *Attorney, Agent, or Firm* — Oliff PLC (57) ABSTRACT

A battery pack includes multiple sub-modules each of which includes multiple battery cells electrically connected to each other, and an exhaust duct that is provided between and integrated with at least the two battery modules facing each other. The exhaust duct includes therein an exhaust passage that communicates with an outer surface of a safety valve provided in each battery cell in each of the facing battery modules.

6 Claims, 7 Drawing Sheets

BATTERY PACK

CROSS REFERENCE TO RELATED APPLICATION

This application is based on and incorporates herein by reference Japanese Patent Application No. 2015-013544 filed on Jan. 27, 2015.

TECHNICAL FIELD

The present disclosure relates to a battery pack including multiple battery modules each having multiple battery cells.

BACKGROUND ART

A battery pack disclosed in Patent Document 1 includes a battery module in which multiple battery cells are electrically connected to each other, a housing that houses the battery module, a partitioning member that covers one side of the battery module to provide multiple exhaust passages, and a lid that covers the partitioning member. In this way, the battery pack has an exhaust passage provided so as to cover the entire one side of one battery module. The exhaust passage is a passage formed for guiding a gas to a predetermined discharge place when an internal pressure of the battery cell rises and the gas inside of the battery cell is ejected. The exhaust passage is shut off from an outside until reaching the predetermined place. One side of the battery module, the partitioning member, and the lid configure an exhaust duct internally having an exhaust passage.

In the battery pack of Patent Document 1, there is one exhaust duct that defines an exhaust passage for one battery module. For that reason, in the case of a battery pack including multiple battery modules, there is a need to provide the exhaust duct for each of the battery modules.

Further, in order to improve a power storage capacity required for the battery pack, there is a need to increase the number of battery modules in order to increase the number of battery cells. In particular, the requirement is remarkable in the battery packs installed in vehicles requiring a traveling electric power such as electric vehicles, hybrid vehicles and the like. As the number of battery modules increases more, a volume occupied by the exhaust passage in the entire battery pack increases more, which may increase a size of the battery pack.

PRIOR ART DOCUMENT

Patent Document

Patent Document 1: JP 2011-070872 A

SUMMARY

Accordingly, the present disclosure has been made in view of the foregoing points, and an object of the present disclosure is to provide a battery pack capable of reducing a space occupied by an exhaust passage and reducing an overall size of the battery pack.

According to an aspect of the present disclosure, a battery pack includes: a plurality of battery modules each of which includes a plurality of battery cells electrically connected to each other, the plurality of battery modules including at least two facing battery modules that face each other; and an exhaust duct disposed between the facing battery modules and integrated with the facing battery modules. Each of the facing battery modules has a gas discharge mechanism provided in the battery cell, and the exhaust duct has therein an exhaust passage that communicates with an outer surface of the gas discharge mechanism.

According to the above configuration, the exhaust passage is provided between the facing battery modules, and the outer surfaces of the gas discharge mechanisms of the battery cells of each battery module communicate with the exhaust passage. With the above configuration, when the gas is discharged from any of the battery cells in the facing battery modules, the gas can be discharged to the outside through the exhaust passage between the facing battery modules. In other words, as compared with the battery pack having one exhaust duct for one battery module, an installation space of the battery relative to the entire pack space can be increased. This makes it possible to provide a battery pack that contributes to an improvement in the power storage capacity.

As described above, since the space occupied by the exhaust passage can be reduced, a size of the entire battery pack can be reduced against a demand to improve the power storage capacity.

DESCRIPTION OF EMBODIMENTS

A battery pack 1 according to an embodiment of the present disclosure is applied to, for example, hybrid vehicles with the combination of an internal combustion engine with a motor driven by an electric power charged in a battery as a travel driving source, electric vehicles with a motor as the travel driving source, and so on. Multiple battery cells 2 forming a battery pack 1 can be formed of, for example, a nickel-hydrogen secondary battery, a lithium ion secondary battery, or an organic radical battery.

Figure 1:
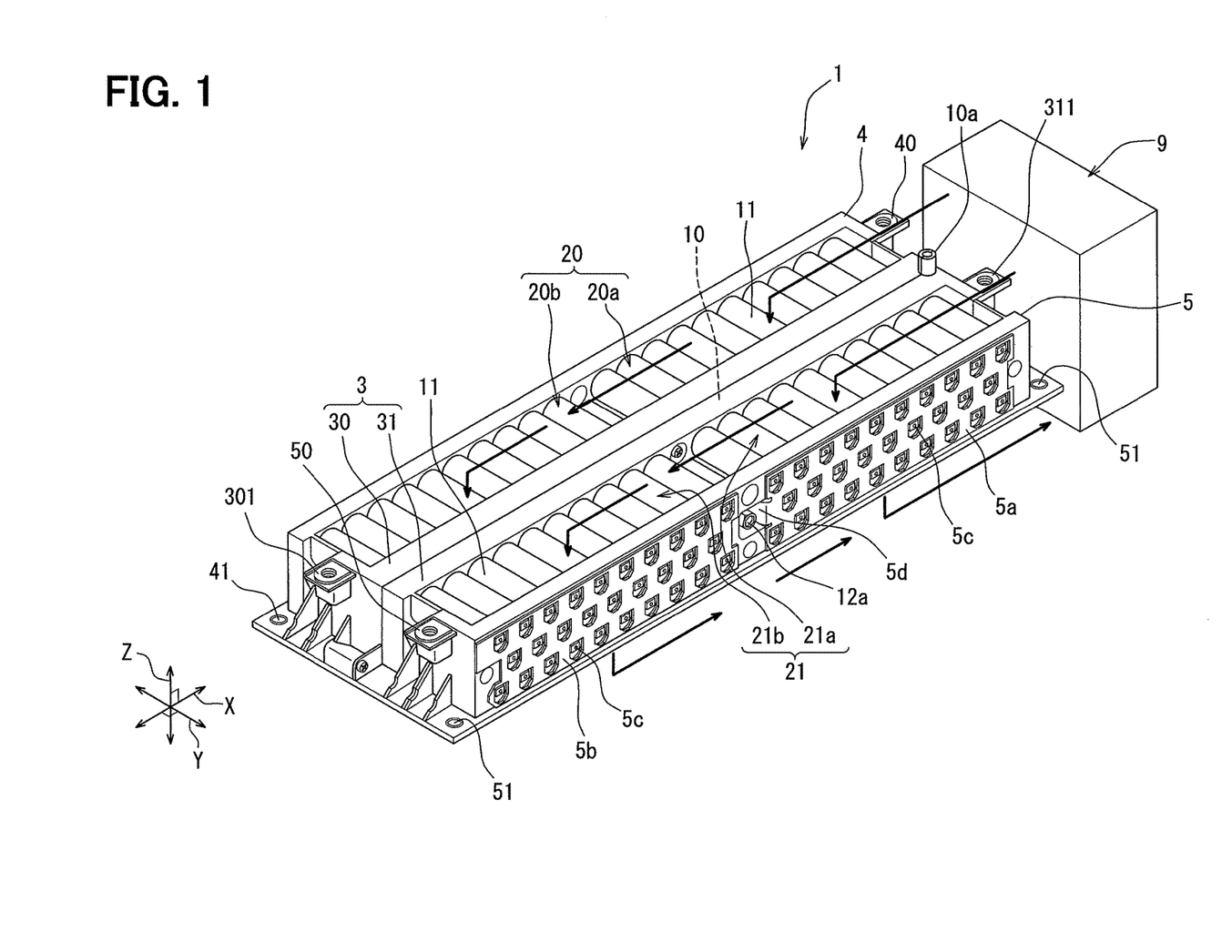
FIG. 1 is a perspective view illustrating a battery pack according to an embodiment of the present disclosure.

The present embodiment will be described with reference to FIGS. 1 to 7. In the figures, an X-direction is a longitudinal direction or a stacking direction along which the battery cells 2 are laminated on each other, a Y-direction is a direction along which at least two battery modules face each other, and a Z-direction is a vertical direction. The battery pack 1 according to the present embodiment includes the multiple battery modules. Each of the battery modules includes multiple battery cells 2 electrically connected to each other. FIG. 1 illustrates a state in which a cover for covering a busbar is removed in the battery pack 1.

As the battery cells 2 used in the battery pack 1 according to the present embodiment, a lithium ion secondary battery will be described as an example. The battery cell 2 disclosed in the present disclosure includes an electrode body having a positive electrode and a negative electrode, and a battery case that accommodates the electrode body and an electrolytic solution. The battery case for accommodating the electrode body is configured by a cylindrical portion as a case body and a lid. The cylindrical portion has a shape capable of accommodating the electrode body, for example, a bottomed cylindrical shape. The cylindrical portion has an opening portion at an upper portion, and is formed so as to accommodate the electrode body through the opening portion. The lid is a disk-shaped member that closes the upper end opening portion of the cylindrical portion. The battery case is preferably made of a metal material that is lightweight and high in thermal conductivity, such as aluminum, stainless steel, or nickel plated steel.

The lid of the battery case is equipped with safety valves 2d each of which is a gas discharge mechanism for discharging the gas generated in the case to the outside. Each of the safety valves 2d is configured so that the valve body is deformed for safety when a pressure in the battery case rises abnormally and the gas in the case is discharged from a gap generated between the valve body and the lid. The safety valve 2d of each battery cell 2 in each of the battery modules 20 and 21 facing each other is disposed such that an outer surface of the safety valve 2d communicates with an exhaust passage 10 in an exhaust duct 3. Therefore, the outer surface of each safety valve 2d communicates with an exhaust outlet port 10a through the exhaust passage 10.

Further, positive electrode terminals 2a are provided on the lid. In the present embodiment, each of the positive electrode terminals 2a protrudes from the lid through a gasket and is electrically connected to a positive electrode of a wound electrode body housed inside of the cylindrical portion. A negative electrode of the wound electrode body is connected to a bottom surface of the cylindrical portion located on a side opposite to the lid, and a bottom portion of the cylindrical portion configures a negative electrode terminal 2b. Like an electrode body of a typical cylindrical battery, the electrode body is configured to include, for example, positive and negative electrode active materials, positive and negative electrode current collectors, separators, and the like.

The battery pack 1 illustrated in FIG. 1 includes a battery module 20 (first battery module) and a battery module 21 (second battery module) provided integrally with the exhaust duct 3 so as to face each other with the exhaust duct 3 interposed between the battery module 20 and the battery module 21. The battery module 20 and the battery module 21 may be used as an example of at least two facing battery modules facing each other. The battery module 20 includes a sub-module 20a and a sub-module 20b each having, for example, 29 battery cells 2 connected in parallel to each other, and electrically connected to a total positive electrode terminal portion 311 and a total negative electrode terminal portion 50 through busbars 4a, 4b, 30a, and 30b. Further, the battery module 21 includes a sub-module 21a and a sub-module 21b each having, for example, 29 battery cells 2 connected in parallel to each other, and electrically connected to a total positive electrode terminal portion 301 and a total negative electrode terminal portion 40 through busbars 5a, 5b, 31a, and 31b.

Figure 2:
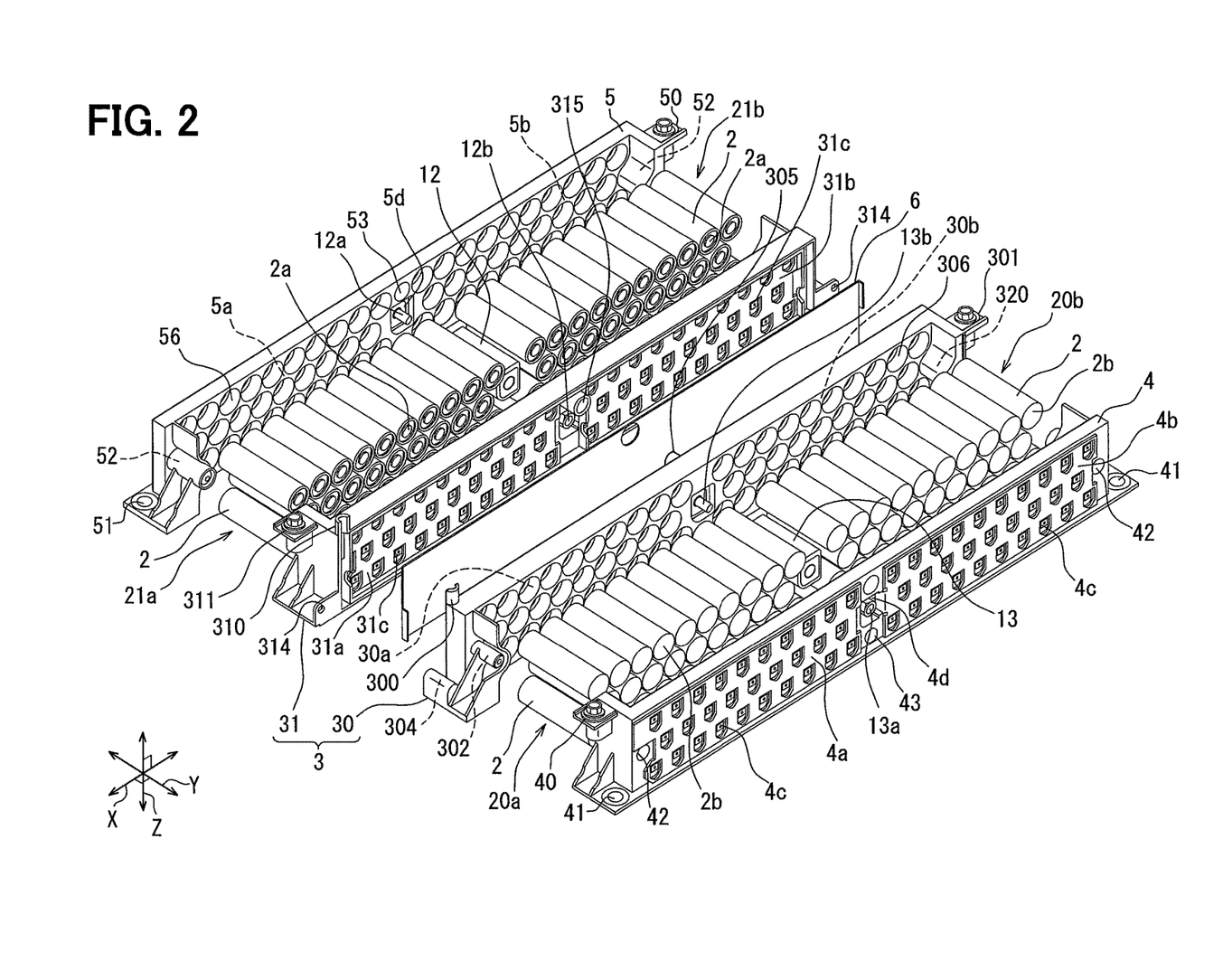
FIG. 2 is an exploded perspective view illustrating the battery pack according to the embodiment.

As illustrated in FIGS. 1 and 2, the exhaust duct 3 includes a cell support member 30 (first cell support member) for supporting the battery module 20, a cell support member 31 (second cell support member) for supporting the battery module 21 in combination. The cell support member 30 and the cell support member 31 have the same shape and size, and have chimneys having a semi-ring section in cross section located on mutually opposite sides in an X-direction (longitudinal direction). A chimney portion 300 of the cell support member 30 and a chimney portion 310 of the cell support member 31 form an exhaust outlet port 10a by assembling the cell support member 30 and the cell support member 31 in a face-to-face relation. Therefore, in the exhaust duct 3, one exhaust outlet port 10a for communicating the exhaust passage 10 internally provided with the outside is provided at a position close to one end portion in the longitudinal direction.

The cell support member 30 is a first support member that supports the sub-module 20a and the sub-module 20b on one side in a Y-direction illustrated in the drawing, and fixes the busbar 30a and the busbar 30b that connect the respective sub-modules in parallel to each other on a back side (the other side) of a portion supporting those modules. The cell support member 31 is a second support member that supports the sub-module 21a and the sub-module 21b on the other side in a Y-direction illustrated in the drawing, and fixes the busbar 31a and the busbar 31b that connect the respective sub-modules in parallel to each other on a back side (one side) of a portion supporting those modules.

Figure 4:
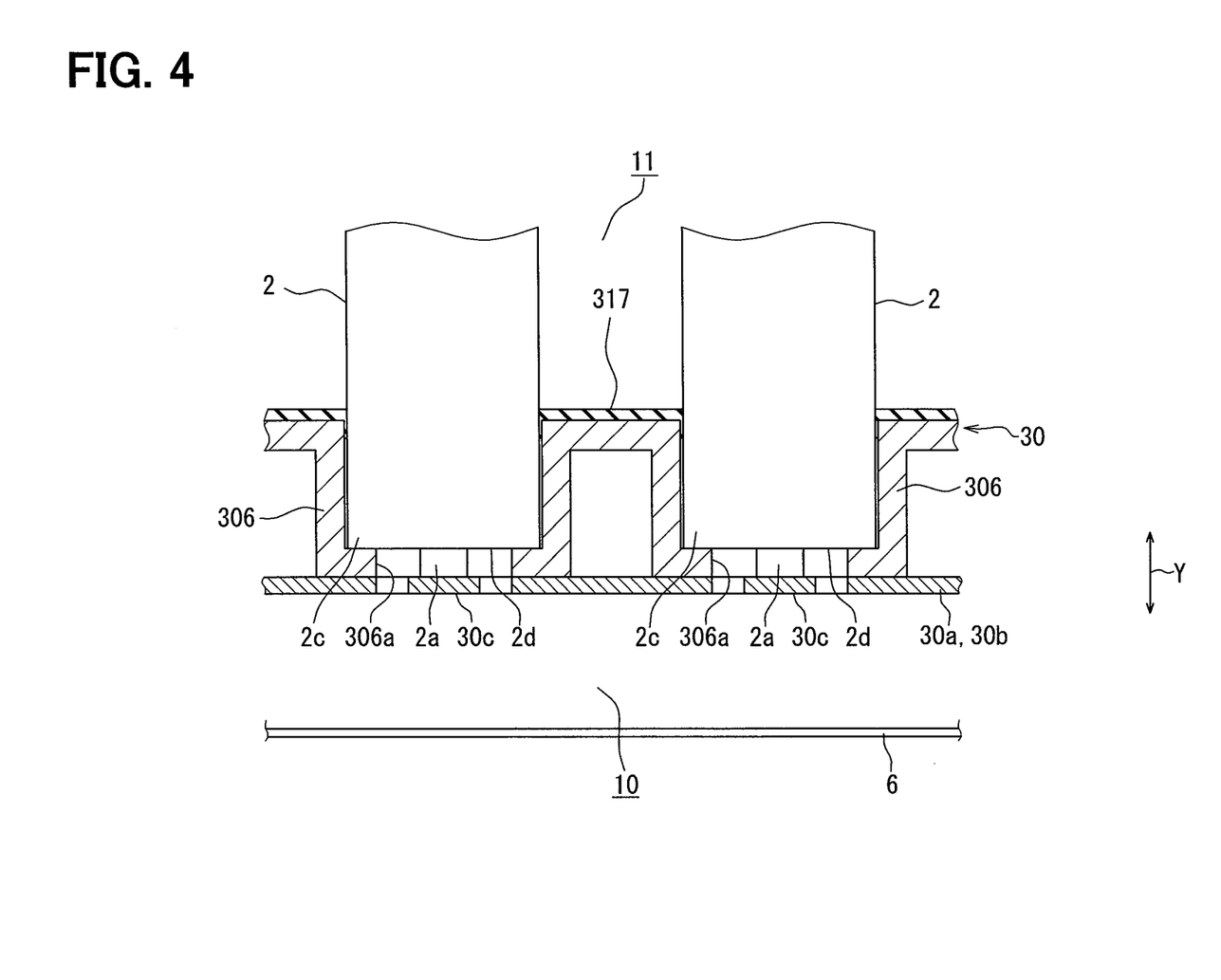
FIG. 4 is a cross-sectional view illustrating a seal member for sealing a gap between a battery cell and an accommodation support portion in a first cell support member according to the embodiment.

As illustrated in FIG. 4, the cell support member 30 has accommodation support portions 306 corresponding to the positions and the number of the battery cells 2 so as to support end portions 2c of the battery cells 2 of the battery module 20. The accommodation support portion 306 has concave portions that conform to a shape of an end portion of each battery cell 2 in an axial direction of the battery cell 2, that is, a columnar shape. Each accommodation support portion 306 is provided with a through hole 306a that penetrates through a bottom portion of the concave portion. The through hole 306a has such a size that an outer surface of the safety valve 2d of each battery cell 2 whose end portion is accommodated and supported by the accommodation support portion 306 and the positive electrode terminal 2a which is the electrode terminal are exposed in the exhaust passage 10.

The busbar 30a is a plate-shaped conductive member that is coupled to the positive electrode terminals 2a of the battery cells 2 forming the sub-module 20a in a state of being fixed to the cell support member 30 on a back side of the accommodation support portion 306, that is, on the exhaust passage 10 side so that 29 battery cells 2 are connected in parallel with each other. The busbar 30b is a plate-shaped conductive member that is coupled to the positive electrode terminals 2a of the battery cells 2 forming the sub-module 20b in a state of being fixed to the cell support member 30 on the exhaust passage 10 side so that 29 battery cells 2 are connected in parallel with each other. The busbar 30a and the busbar 30b are provided with welded portions 30c that come in contact with the respective positive electrode terminals 2a at positions corresponding to the respective positive electrode terminals 2a. The welded portions 30c and the positive electrode terminals 2a are welded together, thereby being capable of connecting the battery cells 2 of the sub-module 20a in parallel to each other by the busbar 30a and connecting the battery cells 2 of the sub-module 20b in parallel to each other by the busbar 30b. In addition, the cell support member 30 is provided with the total positive electrode terminal portion 301 electrically connected to the busbar 30b.

A gap between the battery cell 2 accommodated in each accommodation support portion 306 and the accommodation support portion 306 is sealed with a seal member 317 in a state in which each battery cell 2 included in the battery module 20 is electrically connected to the busbar 30a and the busbar 30b. The seal member 317 is, for example, an epoxy adhesive and enters a gap between a cylindrical surface of each battery cell 2 and the accommodation support portion 306 to block a communication between a cell mounting chamber 11 and the exhaust passage 10 as illustrated in FIG. 4.

A cell support member 4 clamps and supports the battery module 20 in cooperation with the cell support member 30. Like the cell support member 30, the cell support member 4 is provided with accommodation support portions corresponding to the positions and the number of the battery cells 2 so as to support the battery cells 2 of the battery module 20. Like the accommodation support portion 306 of the cell support member 30, the accommodation support portion has a concave portion conforming to a shape of an end portion of each battery cell 2 in the axial direction of the battery cell 2, that is, a columnar shape. Each accommodation support portion is provided with a through hole that penetrates a bottom portion of the concave portion like the accommodation support portion 306. The through hole has such a size that a negative electrode terminal 2b of each battery cell 2 whose end portion is accommodated and supported by the accommodation support portion and the negative electrode terminal 2b is exposed to the exhaust passage 10. In addition, the cell support member 4 is provided with the total negative electrode terminal portion 40 electrically connected to the busbar 4a.

The busbar 4a is a plate-shaped conductive member that is coupled to the negative electrode terminals 2b of the battery cells 2 forming the sub-module 20a in a state of being fixed to the cell support member 4 on a back side of the accommodation support portion, that is, on the exhaust passage 10 side so that 29 battery cells 2 are connected in parallel with each other. The busbar 4b is a plate-shaped conductive member that is coupled to the negative electrode terminals 2b of the battery cells 2 forming the sub-module 20b in a state of being fixed to the cell support member 4 on the exhaust passage 10 side so that 29 battery cells 2 are connected in parallel with each other. The busbar 4a and the busbar 4b are provided with welded portions 4c that come in contact with the respective negative electrode terminals 2b at positions corresponding to the respective negative electrode terminals 2b. The welded portions 4c and the negative electrode terminals 2b are welded together, thereby being capable of connecting the battery cells 2 of the sub-module 20a in parallel to each other by the busbar 4a and connecting the battery cells 2 of the sub-module 20b in parallel to each other by the busbar 4b.

Figure 3:
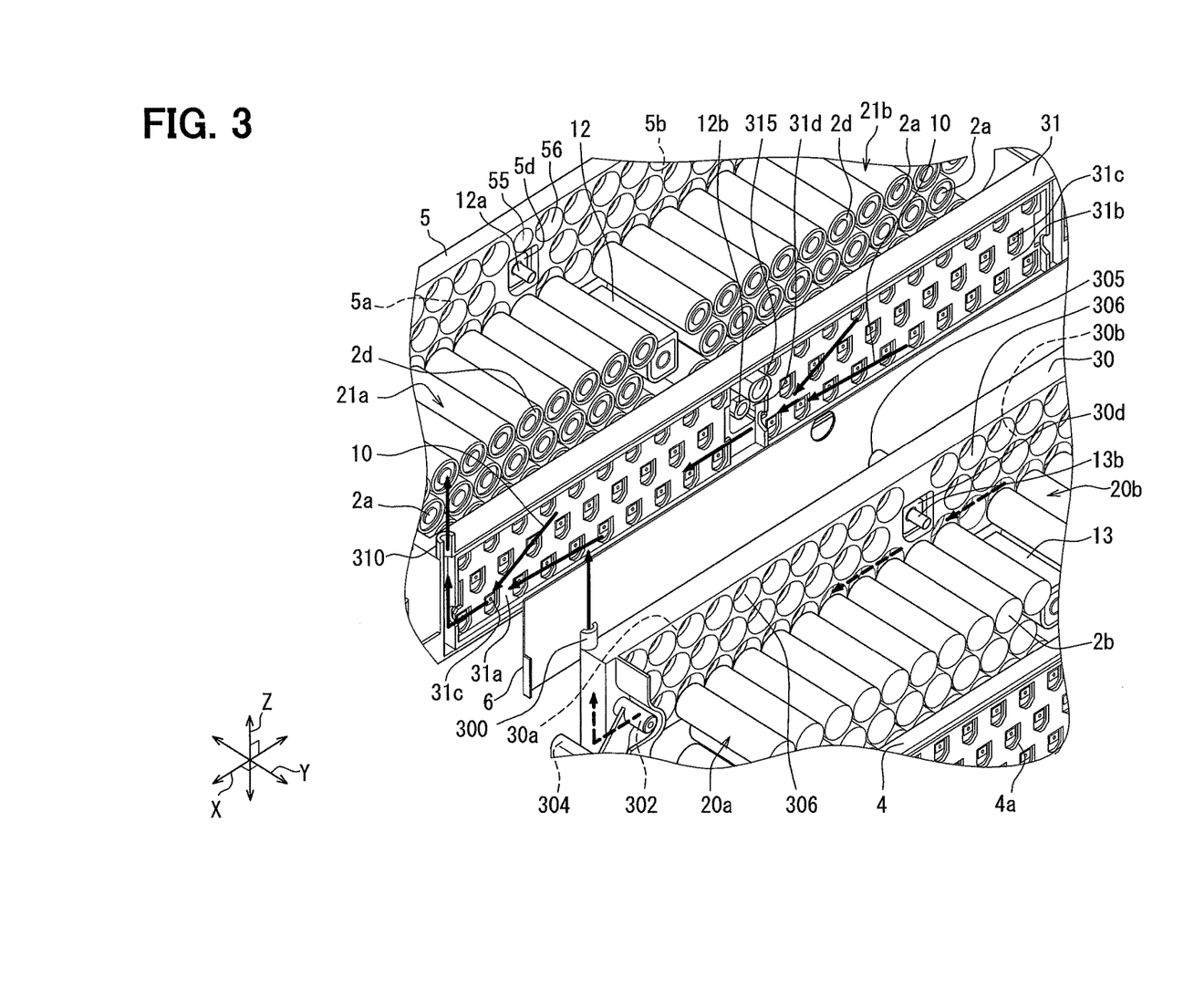
FIG. 3 is an exploded perspective view illustrating a part of the battery pack for illustrating an internal configuration of an exhaust duct according to the embodiment.

Further, as illustrated in FIGS. 2 and 3, the sub-module 20a and the sub-module 20b are electrically connected in series with each other by a busbar 13 which is used for serial connection. An end 30d of the busbar 30a and an end portion 4d of the busbar 4b are fastened to the busbar 13 by a bolt 13a and a bolt 13b each having conductivity, thereby being electrically connected in series with each other. The end 30d of the busbar 30a and the end portion 4d of the busbar 4b are fastened together at predetermined positions of the cell support member 30 and the cell support member 4 by the bolt 13a and the bolt 13b, respectively.

Figure 5:
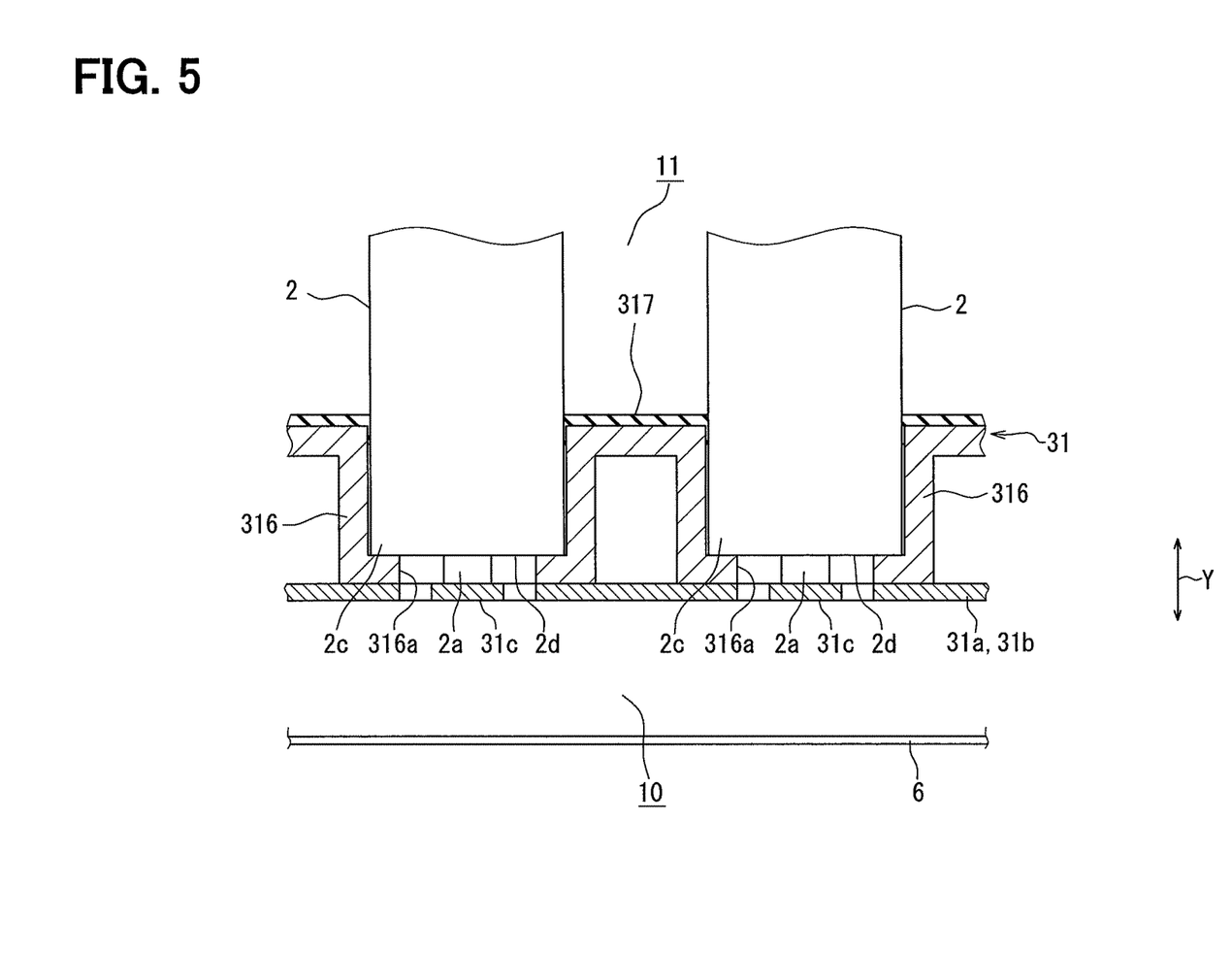
FIG. 5 is a cross-sectional view illustrating a seal member for sealing a gap between a battery cell and an accommodation support portion in a second cell support member according to the embodiment.

As illustrated in FIG. 5, the cell support member 31 has accommodation support portions 316 corresponding to the positions and the number of the battery cells 2 so as to support the battery cells 2 of the battery module 21. The accommodation support portion 316 has concave portions that conform to a shape of an end portion of each battery cell 2 in an axial direction of the battery cell 2, that is, a columnar shape. Each accommodation support portion 316 is provided with a through hole 316a that penetrates through a bottom portion of the concave portion. The through hole 316a has such a size that an outer surface of the safety valve 2d of each battery cell 2 whose end portion is accommodated and supported by the accommodation support portion 316 and the positive electrode terminal 2a which is the electrode terminal are exposed in the exhaust passage 10.

The busbar 31a is a plate-shaped conductive member that is coupled to the positive electrode terminals 2a of the battery cells 2 forming the sub-module 21a in a state of being fixed to the cell support member 31 on a back side of the accommodation support portion 316, that is, on the exhaust passage 10 side so that 29 battery cells 2 are connected in parallel with each other. The busbar 31b is a plate-shaped conductive member that is coupled to the positive electrode terminals 2a of the battery cells 2 forming the sub-module 21b in a state of being fixed to the cell support member 31 on the exhaust passage 10 side so that 29 battery cells 2 are connected in parallel with each other. The busbar 31a and the busbar 31b are provided with welded portions 31c that come in contact with the respective positive electrode terminals 2a at positions corresponding to the respective positive electrode terminals 2a. The welded portions 31c and the positive electrode terminals 2a are welded together, thereby being capable of connecting the battery cells 2 of the sub-module 21a in parallel to each other by the busbar 31a and connecting the battery cells 2 of the sub-module 21b in parallel to each other by the busbar 31b. In addition, the cell support member 31 is provided with the total positive electrode terminal portion 311 electrically connected to the busbar 31a.

A gap between the battery cell 2 accommodated in each accommodation support portion 316 and the accommodation support portion 316 is sealed with a seal member 317 in a state in which each battery cell 2 included in the battery module 21 is electrically connected to the busbar 31a and the busbar 31b. As described above, the seal member 317 is an epoxy adhesive and enters a gap between a cylindrical surface of each battery cell 2 and the accommodation support portion 316 to block a communication between the cell mounting chamber 11 and the exhaust passage 10 as illustrated in FIG. 5.

A cell support member 5 clamps and supports the battery module 21 in cooperation with the cell support member 31. Like the cell support member 31, the cell support member 5 is provided with accommodation support portions corresponding to the positions and the number of the battery cells 2 so as to support the battery cells 2 of the battery module 21. Like the accommodation support portion 316 of the cell support member 31, the accommodation support portion has a concave portion conforming to a shape of an end portion of each battery cell 2 in the axial direction of the battery cell 2, that is, a columnar shape. Each accommodation support portion is provided with a through hole that penetrates a bottom portion of the concave portion like the accommodation support portion 316. The through hole has such a size that a negative electrode terminal 2b of each battery cell 2 whose end portion is accommodated and supported by the accommodation support portion and the negative electrode terminal 2b is exposed to the exhaust passage 10. In addition, the cell support member 5 is provided with the total negative electrode terminal portion 50 electrically connected to the busbar 5b.

The busbar 5a is a plate-shaped conductive member that is coupled to the negative electrode terminals 2b of the battery cells 2 forming the sub-module 21a in a state of being fixed to the cell support member 5 on a back side of the accommodation support portion, that is, on the exhaust passage 10 side so that 29 battery cells 2 are connected in parallel with each other. The busbar 5b is a plate-shaped conductive member that is coupled to the negative electrode terminals 2b of the battery cells 2 forming the sub-module 21b in a state of being fixed to the cell support member 5 on the exhaust passage 10 side so that 29 battery cells 2 are connected in parallel with each other. The busbar 5a and the busbar 5b are provided with welded portions that come in contact with the respective negative electrode terminals 2b at positions corresponding to the respective negative electrode terminals 2b. The welded portions and the negative electrode terminals 2b are welded together, thereby being capable of connecting the battery cells 2 of the sub-module 21a in parallel to each other by the busbar 4a and connecting the battery cells 2 of the sub-module 21b in parallel to each other by the busbar 5b.

Further, as illustrated in FIGS. 2 and 3, the sub-module 21a and the sub-module 21b are electrically connected in series with each other by a busbar 12 which is used for serial connection. An end 31d of the busbar 31a and an end portion 5d of the busbar 5b are fastened to the busbar 12 by a bolt 12a and a bolt 12b each having conductivity, thereby being electrically connected in series with each other. The end 31d of the busbar 31a and the end portion 5d of the busbar 5b are fastened together at predetermined positions of the cell support member 31 and the cell support member 5 by the bolt 12a and the bolt 12b, respectively.

The exhaust passage 10 having a rectangular parallelepiped shape having a length in the X-direction and a length in the Z-direction corresponding to the battery modules 20 and 21 and is shaped in a flat in the Y-direction is provided in the interior of the exhaust duct 3. The exhaust duct 3 includes a thermal diffusion plate 6 that is interposed between the cell support member 30 and the cell support member 31 in a facing positional relationship to divide the exhaust passage 10 into two pieces in the Y-direction. Further, the thermal diffusion plate 6 is interposed between the accommodation support portion 306 that supports the battery cells 2 of one battery module 20 of the battery modules 20 and 21 having the facing positional relationship and the accommodation support portion 316 that supports the battery cells 2 of the other battery module 21.

The thermal diffusion plate 6 is a member having a thermal conductivity, and can be made of, for example, a metal plate. Further, the thermal diffusion plate 6 has a size and shape over the exhaust passage 10 as a whole. The thermal diffusion plate 6 is installed inside of the exhaust duct 3 so as to ensure a predetermined distance from each of the busbars 30a and 30b fixed to the cell support member 30 and the busbars 31a and 31b fixed to the cell support member 31. Therefore, when the safety valve 2d of each battery cell 2 is opened and the gas is ejected into the exhaust passage 10, the gas can collide with the thermal diffusion plate 6. Although a temperature of a portion of the thermal diffusion plate 6 with which the gas collides locally rises, since the thermal diffusion plate 6 has the thermal conductivity, heat is likely to be transferred to the overall thermal diffusion plate 6 and a local heating can be reduced. Further, since the thermal diffusion plate 6 functions as a shield plate that shields the ejected gas, the gas can be restrained from diffusing toward the battery module on the opposite side.

The battery pack 1 is controlled by electronic components used for charging and discharging the multiple battery cells 2 or regulating the temperature. The electronic components include, for example, a DC/DC converter, a motor for driving an air blowing member, an electronic component controlled by an inverter, various electronic control devices and the like. For example, the electronic components are portions activated by an electric power regulated by a power element which is a switching power supply device.

The battery pack 1 has the cell mounting chamber 11 in which the battery modules 20 and 21 are accommodated. A temperature control fluid is circulated in the cell mounting chamber 11 by a fluid drive device 9 that drives a predetermined temperature control fluid. The exhaust duct 3 has a function of separating the cell mounting chamber 11 and the exhaust passage 10 as separate spaces. Therefore, the exhaust duct 3 does not allow the temperature control fluid to flow into the exhaust passage 10, but functions to prevent the gas ejected from each battery cell 2 from flowing into the cell mounting chamber 11 by unsealing the corresponding safety valve 2d.

As illustrated in FIG. 1, the temperature control fluid flowing out from the fluid drive device 9 flows into the respective cell mounting chambers 11 in which the respective battery modules 20 and 21 are accommodated from above, and is drawn into the fluid driving device 9 after descending around while coming in contact with the respective battery cells 2. When the temperature control fluid is air, a centrifugal blower having a sirocco fan that exhibits a high performance against a high pressure loss can be used for the fluid drive device 9. Various fluids can be employed as the temperature control fluid, and, for example, water or a refrigerant can be used in addition to air.

In the battery pack 1, the case for accommodating the battery modules 20 and 21 is formed by the exhaust duct 3 and the cell support member 4 and the cell support member 5 which are arranged on both sides of the exhaust duct 3 in the Y-direction. The case is a rectangular parallelepiped case opened at upper and lower end portions of the case, and an opening portion at the upper end and an opening portion at the lower end configure an inflow port and an outflow port of the temperature control fluid in the cell mounting chamber 11. Further, the case is made of a material having an electrical insulation property, for example, a resin material. The case is equipped with four attachment portions 41 and 51 for fixing a housing to the vehicle side by bolting or the like, and may be provided integrally with an equipment storage box. For example, a battery monitoring unit that receives detection results of a voltage, a temperature, and so on from various sensors, a control device that can communicate with the battery monitoring unit and exchanges a power with a DC/DC converter and controls the fluid drive device 9, a wire harness that connects the various equipments to each other, and so on are accommodated in the equipment box. The battery monitoring unit is a battery electronic control unit that monitors a state of each battery cell 2 and is connected to the battery pack 1 by a large number of wirings.

Figure 6:
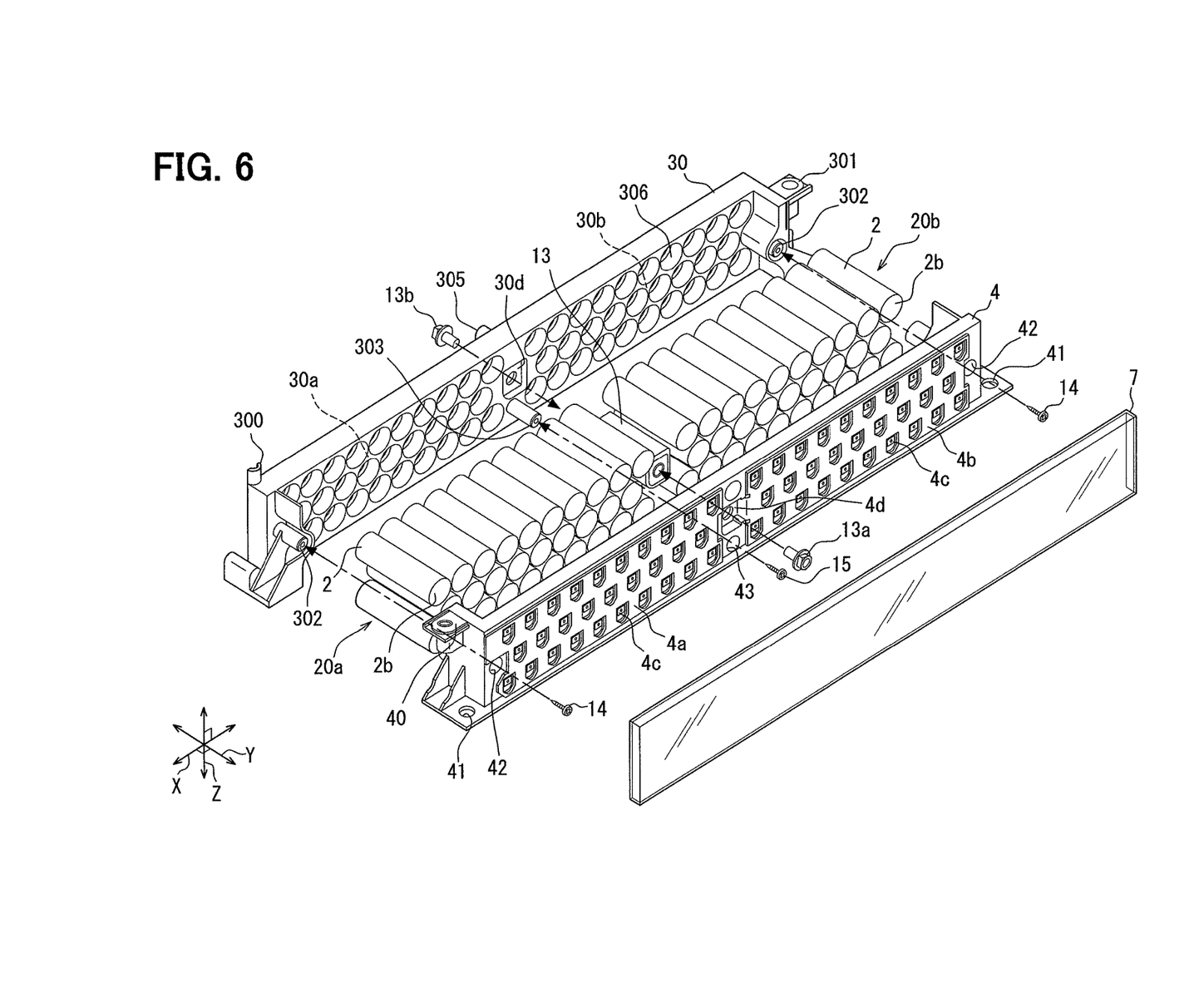
FIG. 6 is an exploded perspective view illustrating a structure for supporting a battery module according to the embodiment.

Subsequently, the assembly of the battery pack 1 will be described with reference to FIGS. 6 and 7. FIG. 6 is an exploded perspective view for illustrating the assembly of the cell support member 30, the battery module 20, the cell support member 4, and the cover 7 in the battery pack 1. First, the busbar 30a and the busbar 30b are fixed to the cell support member 30 at predetermined positions, and the busbar 4a and the busbar 4b are fixed to the cell support member 4 at predetermined positions. Further, the battery module 20 is sandwiched between the cell support member 30 and the cell support member 4, and the sub-module 20a and the sub-module 20b are electrically connected to each other.

In this step, each of the battery cells 2 of the sub-module 20a and each battery cell 2 of the sub-module 21a are loaded to the accommodation support portion 306 of the cell support member 30 and the accommodation support portion of the cell support member 4, respectively, and the busbar 13 is placed in a predetermined position. Next, an assembly in which the battery module 20, the busbar 13, the cell support member 30, and the cell support member 4 are integrated together is fixed as one sub-unit, and the respective sub-modules 20a and 20b are electrically connected to each other.

More specifically, screw tightening is performed at a total of three places, including one at each end portion of the assemble in the longitudinal direction and one at the center in the longitudinal direction, and the battery module 20 is fixedly sandwiched between the cell support member 4 and the cell support member 30. One screw 14 is passed through a screw through hole 42 provided at one end portion of the cell support member 4 in the longitudinal direction and screwed into a screw hole 302 provided in the cell support member 30. Further, in the cell support member 4, the other screw 14 is passed through the other screw through hole 42 provided at an opposite end portion in the longitudinal direction and is screwed into the other screw hole 302 provided in the cell support member 30. Further, in the cell support member 4, a screw 15 is passed through a screw through hole 43 provided in a center in the longitudinal direction and is screwed into a screw hole 303 provided in the cell support member 30. The screws are fastened at those three positions, to thereby narrow a space between the cell support member 4 and the cell support member 30. As a result, the battery module 20 can be clamped and fixed integrally with the cell support member 4 and the cell support member 30.

Further, a bolt 13a is passed through a threaded through hole provided in the end portion 4d of the busbar 4b and the cell support member 4, and the bolt 13a is screwed into a screw hole provided in the busbar 13. In addition, a bolt 13b is passed through a screw through hole provided in the end portion 30d of the busbar 30a and the cell support member 30, and the bolt 13b is screwed into a screw hole provided in the busbar 13. As a result, a first sub-unit including the battery module 20 is integrally fixed, the busbar 30a and the busbar 4b are connected in series to each other so that the sub-module 20a and the sub-module 20b can be electrically connected in series to each other by the busbar 13. Finally, a cover 7 for electrical insulation is attached to the cell support member 4 so as to cover the busbars 4a and 4b. The cover 7 is a skeleton member made of a translucent or transparent material, through which the busbars and the like can be visually recognized from the outside.

Also, the assembly of the cell support member 31, the battery module 21, the cell support member 5, and the cover 7 can be carried out similarly. More specifically, the busbar 31a and the busbar 31b are fixed to the cell support member 31 at predetermined positions, and the busbar 5a and the busbar 5b are fixed to the cell support member 5 at predetermined positions. Further, the battery module 21 is sandwiched between the cell support member 31 and the cell support member 5, and the sub-module 21a and the sub-module 21b are electrically connected to each other.

Further, screw tightening is performed at a total of three places, including one at each end portion of the assemble in the longitudinal direction and one at the center in the longitudinal direction, and the battery module 21 is fixedly sandwiched between the cell support member 5 and the cell support member 31. One screw is passed through a screw through hole 52 provided at one end portion of the cell support member 5 in the longitudinal direction and screwed into a screw hole provided in the cell support member 31. Further, in the cell support member 5, the other screw is passed through the other screw through hole 52 provided at an opposite end portion in the longitudinal direction and is screwed into the other screw hole provided in the cell support member 31. Further, in the cell support member 5, a screw is passed through a screw through hole provided in a center in the longitudinal direction and is screwed into a screw hole provided in the cell support member 31. The screws are fastened at those three positions, to thereby narrow a space between the cell support member 5 and the cell support member 31. As a result, the battery module 21 can be clamped and fixed integrally with the cell support member 5 and the cell support member 31.

Further, a bolt is passed through a threaded through hole provided in the end portion 5d of the busbar 5b and the cell support member 5, and the bolt 12a is screwed into a screw hole provided in the busbar 12. In addition, a bolt 12b is passed through a screw through hole provided in the end portion 31d of the busbar 31a and the cell support member 31, and the bolt 12b is screwed into a screw hole provided in the busbar 12. As a result, a first sub-unit is integrally fixed, the busbar 31a and the busbar 5b are connected in series to each other so that the sub-module 21a and the sub-module 21b can be electrically connected in series to each other by the busbar 12.

Figure 7:
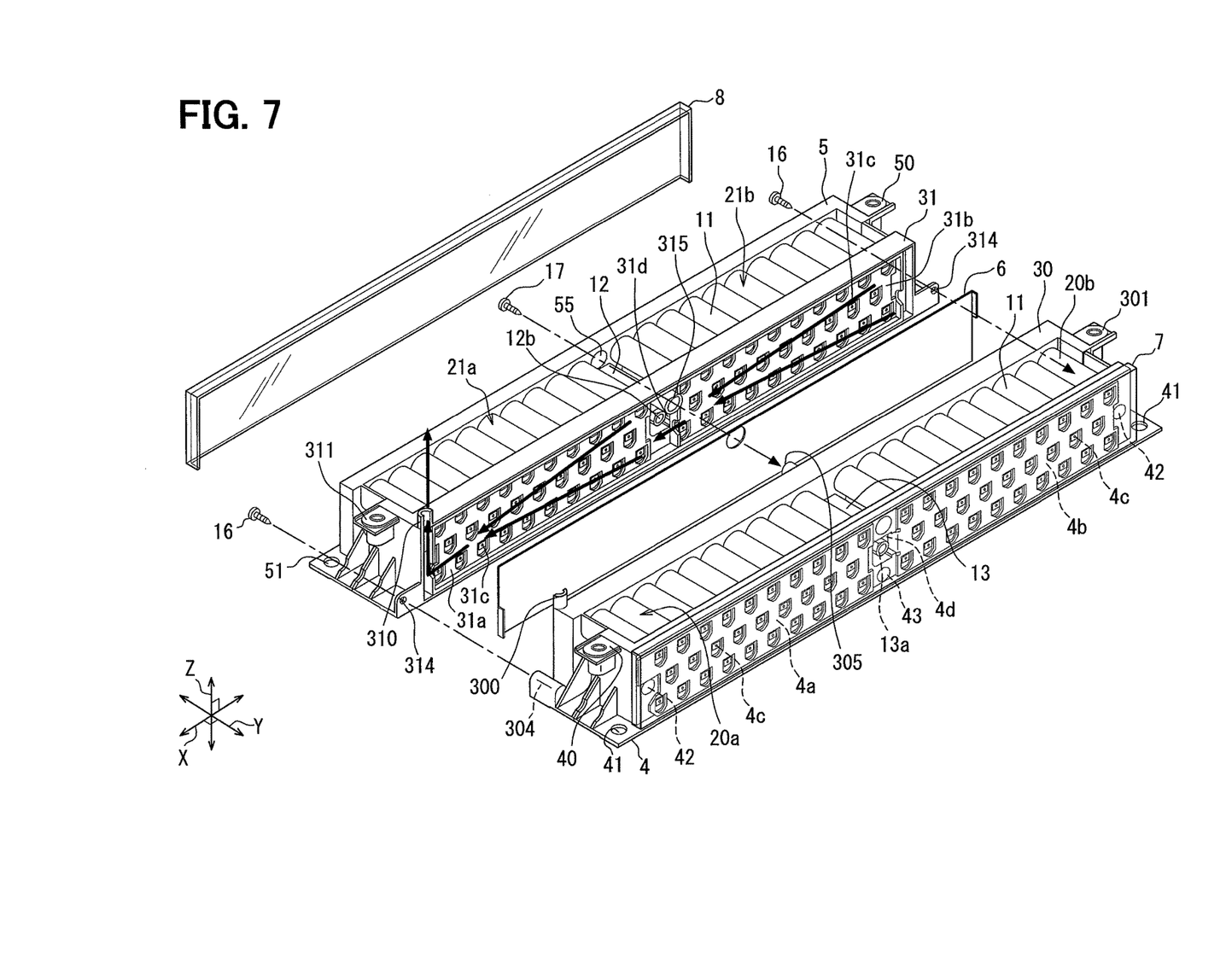
FIG. 7 is an exploded perspective view illustrating a structure in which two battery modules and an exhaust duct which are correlated in position with each other are combined integrally with each other according to the embodiment.

Next, FIG. 7 is an exploded perspective view illustrating the assembly of the first sub-unit including the battery module 20 and the second sub-unit including the battery module 21 in the battery pack 1. More specifically, screw tightening is performed at a total of three places, including one at each end portion of the assemble in which two sub-units are combined together in the longitudinal direction and one at the center in the longitudinal direction, and those two sub-units are fixed to each other.

First, from a state in which the cell support member 30 in the first sub-unit faces the cell support member 31 in the second sub-unit and the thermal diffusion plate 6 is disposed between the cell support member 30 and the cell support member 31, the cell support member 30 and the cell support member 31 are combined together.

Further, a screw 16 is passed through a screw through hole 314 provided at each end portion of the cell support member 31 in the longitudinal direction and is screwed into a screw hole 304 provided in the cell support member 30. Further, in the cell support member 5, a screw 17 is passed through a screw through hole 55 provided in a center in the longitudinal direction and a screw through hole provided in the thermal diffusion plate 6 and is screwed into a screw hole 305 provided in the cell support member 30. The first sub-unit and the second sub-unit can be fixed integrally with each other by tightening the screws at these three places. Finally, a cover 8 for electrical insulation is attached to the cell support member 5 so as to cover the busbars 5a and 5b. The cover 8 is a skeleton member made of a translucent or transparent material, through which the busbars and the like can be visually recognized from the outside.

According to the above embodiment, the battery pack 1 includes the multiple battery modules 20 and 21 each having the multiple battery cells 2, and the exhaust duct 3 that is provided integrally with the battery module between at least the two battery modules 20 and 21 in a facing positional relationship. The exhaust duct 3 is internally provided integrally with the exhaust passage 10 that communicates with an outer surface of the safety valve 2d which is a gas discharge mechanism provided in each battery cell 2 in each of the battery modules 20 and 21 having the opposing positional relationship.

According to the above configuration, the exhaust passage 10 is provided between at least two opposing battery modules 20 and 21, and the outer surfaces of the gas discharge mechanisms of the battery cells 2 in each of the battery modules 20 and 21 communicate with the exhaust passage 10. With the above configuration, when the gas is discharged from any of the battery cells 2 in at least two battery modules 20 and 21 having the facing relationship, the gas can be discharged to the outside through the exhaust passage 10 located between those battery modules 20 and 21. In other words, as compared with the battery pack having one exhaust duct for one battery module, an installation space of the secondary battery relative to the entire pack can be increased. In other words, because a smoke exhaust duct can be integrated with the two battery modules in the battery pack 1, a space for exhaust duct in the battery pack 1 can be saved. With the above configuration, since the space occupied by the exhaust passage 10 can be reduced, the battery pack 1 reduced in an overall size can be provided against a demand to improve a power storage capacity.

Further, the exhaust duct 3 has accommodation support portions 306 and 316 that accommodate and support at least the end portion 2c of each battery cell 2 in the facing battery modules 20 and 21. The through holes 306a and 316a through which the outer surface of each gas discharge mechanism is exposed to the exhaust passage 10 are provided in each of the accommodation support portions 306 and 316.

According to this configuration, in the exhaust duct 3, a part for supporting each cell and a part for ejecting the gas can be provided in one portion. Therefore, the battery pack 1 provided with the exhaust duct 3 having both of the function as the exhaust duct 3 and the function of holding and positioning the multiple battery cells 2 can be provided. According to the above configuration, the exhaust duct 3 that reduces the number of components, has the multiple functions, and is compact can be provided.

Further, the exhaust duct 3 includes the first support member for supporting the battery module 20 located on one side of the facing battery modules 20 and 21, and the second support member for supporting the battery module 21 located on the other side. The exhaust passage 10 is a passage provided inside of the assembly in which the first support member and the second support member are combined with each other face to face.

According to the above configuration, the assembly in which the support portions of the cells and the gas exhaust passage can be integrally configured can be provided. With the provision of the assembly, a space for forming the support portions of the cell and the exhaust passage can be reduced and the mounting efficiency of the battery cells 2 in the battery pack 1 can be improved.

Further, the first support member has the accommodation support portion 306 that accommodates and supports at least the end portion of each battery cell 2 in the battery module 20. Further, the second support member has the accommodation support portion 316 that accommodates and supports at least the end portion of each battery cell 2 in the battery module 21. The through hole 306a through which the outer surface of each gas discharge mechanism is exposed to the exhaust passage 10 is provided in the accommodation support portion 306. The through hole 316a through which the outer surface of each gas discharge mechanism is exposed to the exhaust passage 10 is provided in the accommodation support portion 316.

According to the above configuration, in the first support member and the second support member, the part for supporting the cells and the part for ejecting the gas can be provided in one portion. Therefore, the battery pack 1 in which members having both of the function of the exhaust duct 3 and the function of holding and positioning the multiple battery cells 2 are combined together can be provided. According to the above configuration, the first support member and the second support member having the multiple functions and being compact can be provided.

Further, the busbars 30a and 30b for electrically connecting the multiple battery cells 2 to each other in the supported battery module 20 are integrally fixed to the first support member. The busbars 31a and 31b for connecting the multiple battery cells 2 to each other in the battery module 21 to be supported so as to enable energization are integrally fixed to the second support member. Further, as the fixing structure of the busbars, a fastening structure by screws, a fixing structure by engagement or fitting, and a structure by insert molding of the busbars with respect to the resin member can be employed.

According to the above configuration, the members for fixing the busbars, the members for supporting the cells, and the members for providing the exhaust passage 10 can be configured by one member. Therefore, the battery pack 1 having a member having all of the cell support function, the function as the exhaust duct 3 for discharging the gas, and the function for realizing an electric connection of the multiple battery cells 2 can be provided. Further, the battery pack 1 has a separation structure for separating a portion for fixing the busbars and a portion for supporting the cells from each other on both sides of the first support member and the second support member. According to the above configuration, the battery pack 1 that can provide the member forming the exhaust duct 3 with the multiple functions, and effectively utilizes a space occupied by the exhaust duct 3 can be obtained.

Further, the exhaust duct 3 partitions the cell mounting chamber 11 where the battery modules 20 and 21 to be supported are installed, and the exhaust passage 10 as separate spaces. A temperature control fluid that comes in contact with the battery modules 20 and 21 flows in the cell mounting chamber 11. A gap between the battery cells 2 accommodated in the accommodation support portions 306 and 316 and the accommodation support portions 306 and 316 is sealed with the seal member 317.

According to the above configuration, when the gas is ejected from the inside of the battery cell 2 to the exhaust passage 10, the gas can be prevented from flowing out to the cell mounting chamber 11. Therefore, the battery pack 1 capable of blocking a communication between a room through which the temperature control fluid flows and the passage through which a flue gas flows with the compact size is obtained.

The exhaust duct 3 includes therein the thermal diffusion plate 6 having a thermal conductivity which is interposed between the accommodation support portion 306 supporting the battery module 20 and the accommodation support portion 316 supporting the second battery module 21 in the facing battery modules 20 and 21, and the thermal diffusion plate 6 separates the exhaust passage into two passages. According to the above configuration, for example, when a gas is discharged from one of the battery modules, the gas can be restrained from flowing out to the other battery module side by the thermal diffusion plate 6 functioning as a partitioning member. As a result, a chain-like gas ejection and an influence on the peripheral components associated with the gas ejection at one place can be suppressed. In addition, since a thermal diffusion occurs due to the thermal conductivity of the thermal diffusion plate 6, the occurrence of a local high temperature portion can be suppressed, which contributes to a suppression of the deterioration of the local component and the like.

In addition, the exhaust duct 3 has a single exhaust outlet port 10a through which the exhaust passage 10 communicates with the outside. According to the above configuration, since the exhaust outlet portion is provided in a part of the exhaust duct 3 also serving as the cell support member, the configuration contributes to a reduction in the size of the mounting space of the battery pack 1.

The preferred embodiment of the present disclosure has been described above, but this disclosure is not limited to the above-mentioned embodiment at all and can be modified without departing from the gist of this disclosure. The structures of the embodiment are merely illustrative, and the scope of the present disclosure is not limited to the range of the description of the structures.

In the embodiment described above, the battery cells configuring each battery module can also be configured by a single cell having a prismatic exterior case made of metal. The rectangular single cell is a flat rectangular parallelepiped whose outer peripheral surface is covered with an outer case made of, for example, aluminum, an aluminum alloy or the like. In the rectangular parallelepiped battery cell, a predetermined electrode terminal is connected to the busbar, and the safety valve to which the gas is ejected due to an increase in internal pressure is located in correspondence with the opening portions of the first support member providing the exhaust duct and is supported by the first support member.

The number of battery modules included in the battery pack according to the present disclosure is not limited to the number disclosed in the above-described embodiment. In addition, one exhaust duct of the battery pack is provided for at least two battery modules installed so that the safety valves face each other. Further, one battery pack may include the multiple exhaust ducts provided in at least two battery modules.

In the above embodiment, grooves or protrusions of labyrinthine or spiral structure may be provided on an inner surface of the accommodation support portion 306 and the accommodation support portion 316.

In the above embodiment, the fluid drive device for forcibly feeding the temperature control fluid to the fluid passage may be of a type in which the temperature control fluid is drawn into the fluid passage, or a type in which the temperature control fluid is pushed into the fluid passage.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

The invention claimed is:

1. A battery pack comprising:
a plurality of battery modules each of which includes a plurality of battery cells electrically connected to each other, the plurality of battery modules including at least two facing battery modules that face each other; and
an exhaust duct disposed between the at least two facing battery modules and integrated with the at least two facing battery modules, wherein
each of the plurality of battery cells of the at least two facing battery modules has a gas discharge mechanism,
the exhaust duct has an exhaust passage that communicates with an outer surface of the gas discharge mechanism of each of the plurality of battery cells of the at least two facing battery modules,
the at least two facing battery modules include a first battery module that has a group of battery cells and a second battery module that has another group of battery cells and faces the first battery module,
the exhaust duct includes a first unitary support member that supports the first battery module and a second unitary support member that supports the second battery module, and
a surface of the first unitary support member facing away from the group of battery cells and a surface of the second unitary support member facing away from the another group of battery cells are in direct contact with and fixed to each other to form an assembly in which the exhaust passage is provided.

2. The battery pack according to claim 1, wherein
the first unitary support member includes first accommodation support portions that accommodate and support at least end portions of the group of battery cells,
the second unitary support member includes second accommodation support portions that accommodate and support at least end portions of the another group of battery cells, and
each of the first and second accommodation support portions includes through holes through which the outer surfaces of the gas discharge mechanisms of each battery cell that is accommodated in the first and second accommodation support portions is exposed to the exhaust passage.

3. The battery pack according to claim 2, wherein
the first unitary support member is integrally fixed to a first busbar that electrically connects the group of battery cells to each other, and
the second unitary support member is integrally fixed to a second busbar that electrically connects the another group of battery cells to each other.

4. The battery pack according to claim 2, wherein
the exhaust duct includes a thermal diffusion plate having a thermal conductivity and interposed between the first accommodation support portions and the second accommodation support portions, and
the thermal diffusion plate separates the exhaust passage into two passages.

5. The battery pack according to claim 2, wherein
each of the first and second accommodation support portions has a recess that has a shape conforming to a shape of the end portion of a corresponding one of the battery cells in an axial direction of the battery cells, and the end portion of the corresponding one of the battery cells is inserted and fitted into the recess of the each of the first and second accommodation support portions and is in contact with a bottom of the recess, and the through hole of the each of the first and second accommodation support portions extends through the bottom of the recess.

6. The battery pack according to claim 1, wherein the exhaust duct has a single exhaust outlet port through which the exhaust passage communicates with an outside.

* * * * *